United States Patent
Kirk et al.

(10) Patent No.: US 9,134,142 B2
(45) Date of Patent: Sep. 15, 2015

(54) ROTARY ENCODER WITH FREE FLOATING FLEXIBLE SENSOR CARRIER

(71) Applicants: Charles R. Kirk, Nixa, MO (US); James J Burcham, Bayview, ID (US)

(72) Inventors: Charles R. Kirk, Nixa, MO (US); James J Burcham, Bayview, ID (US)

(*) Notice: Subject to any disclaimer, the term of this patent is extended or adjusted under 35 U.S.C. 154(b) by 36 days.

(21) Appl. No.: 14/213,898

(22) Filed: Mar. 14, 2014

(65) Prior Publication Data

US 2014/0263988 A1 Sep. 18, 2014

Related U.S. Application Data

(60) Provisional application No. 61/783,710, filed on Mar. 14, 2013, provisional application No. 61/882,304, filed on Sep. 25, 2013.

(51) Int. Cl.
 *G01D 5/347* (2006.01)
 *G01D 5/244* (2006.01)

(52) U.S. Cl.
 CPC .................................. *G01D 5/24442* (2013.01)

(58) Field of Classification Search
 CPC .............. G01D 5/347; G01D 5/34707; G01D 5/34715; G01D 5/3473; G01D 5/34738; G01D 5/24438; G01D 5/24433; G01D 5/24428; G01D 5/24442; G01D 5/142; G01D 5/145
 See application file for complete search history.

(56) References Cited

U.S. PATENT DOCUMENTS

| | | | | |
|---|---|---|---|---|
| 4,102,028 A * | 7/1978 | Currie | ......... | 29/281.5 |
| 4,556,792 A * | 12/1985 | Kano et al. | ......... | 250/231.14 |
| 4,593,269 A * | 6/1986 | Nakamura et al. | ......... | 341/13 |
| 4,654,522 A * | 3/1987 | Gornick et al. | ......... | 250/231.18 |
| 4,667,098 A * | 5/1987 | Everett | ......... | 250/231.14 |
| 5,063,382 A * | 11/1991 | Ohsumi | ......... | 341/15 |
| 5,107,107 A * | 4/1992 | Osborne | ......... | 250/231.14 |
| 5,758,427 A * | 6/1998 | Feichtinger et al. | ......... | 33/1 PT |
| 6,820,511 B2 * | 11/2004 | Mutschler et al. | ......... | 73/866.5 |
| 7,205,530 B2 * | 4/2007 | Jones | ......... | 250/231.13 |
| 7,470,889 B2 * | 12/2008 | Jones et al. | ......... | 250/231.13 |
| 7,601,948 B1 * | 10/2009 | Setbacken et al. | ......... | 250/231.13 |
| 8,471,554 B2 * | 6/2013 | Lee | ......... | 324/207.25 |
| 2004/0079177 A1 * | 4/2004 | Mutschler et al. | ......... | 73/865.9 |
| 2007/0009323 A1 * | 1/2007 | Jones et al. | ......... | 403/345 |
| 2008/0238267 A1 * | 10/2008 | Scharrer et al. | ......... | 310/68 B |
| 2008/0307665 A1 * | 12/2008 | Madore | ......... | 33/707 |
| 2009/0147271 A1 * | 6/2009 | Wright | ......... | 356/614 |
| 2012/0187942 A1 * | 7/2012 | Lee | ......... | 324/207.25 |
| 2013/0234548 A1 * | 9/2013 | Oishi | ......... | 310/71 |
| 2014/0037368 A1 * | 2/2014 | Beha et al. | ......... | 403/220 |
| 2014/0263988 A1 * | 9/2014 | Kirk et al. | ......... | 250/231.13 |

* cited by examiner

*Primary Examiner* — John Lee

(57) ABSTRACT

A rotary encoder with free floating flexible sensor carrier provides a sensor carrier that eliminates the traditional need for bearings and a housing in a rotary encoder, as well as allowing for significant cost savings in material and installation costs, improving acceleration and reducing startup and running torque. A bushing is rotationally fixed to a shaft the rotation of which is desired to be measured. An encoder disc is axially connected to the bushing. A sensor is held in an alignment above the encoder disc by a sensor carrier. The sensor may be connected directly to the sensor carrier or to a circuit board which is connected to the sensor carrier. A shaft alignment portion of the sensor carrier encircles the shaft and a plurality of stabilizing arms hold the sensor carrier in place, thus maintaining the sensor in proper alignment.

20 Claims, 8 Drawing Sheets

ROTARY ENCODER WITH FREE FLOATING FLEXIBLE SENSOR CARRIER

The current application claims a priority to the U.S. Provisional Patent application Ser. No. 61/793,710 filed on Mar. 14, 2013 and the U.S. Provisional Patent application Ser. No. 61/882,304 filed on Sep. 25, 2013.

FIELD OF THE INVENTION

The present invention relates generally to an apparatus of an encoder. More specifically, the present invention is an apparatus for an encoder that eliminates the need for ball bearings and/or flexible coupling.

BACKGROUND OF THE INVENTION

Encoders are classified as "sensors". Rotary encoders sense rotary motion. A rotary encoder, also called a shaft encoder, is an electro-mechanical device that converts the angular position or motion of a shaft or axle to an analog, digital or other code. Because encoders sense rotary motion and provide signals that can be used to measure and control that motion, they are used in closed-loop motion control systems in which the encoder acts as the feedback device.

The output of the incremental encoder provides information about the motion of the shaft that is further processed elsewhere into information such as speed, distance, revolutions per minute (RPM), acceleration/deceleration and position. Rotary encoders are used in many applications that require precise shaft unlimited rotation, including industrial controls, robotics, elevators, escalators, moving walkways, medical applications, military applications, automotive applications, servo/brush/brushless and stepper motor feedback and many other applications.

An incremental rotary encoder provides cyclical outputs when the encoder's shaft is rotated. The incremental rotary encoder is the most widely used of all rotary encoders due to its low cost and the ability to provide signals that are easily used to provide motion related information such as velocity and RPM.

Rotary encoders are used to track the position of the motor shaft on permanent magnet brushless motors, which are commonly used on computer numerical control (CNC) machines, robots and other industrial equipment. Incremental (quadrature) encoders are used on induction motor type servomotors. In these applications a feedback device (encoder) plays a vital role in ensuring the equipment operates properly. The encoder synchronizes a relative rotor magnet and stator winding positions to the current provided by the drive. Maximum torque results if the current is applied to the winding when the rotor magnets are in a particular position range relative to the stator windings. The motor performs poorly or not at all if timing is not adjusted correctly. Improper encoder alignment on the motor actually causes it to run backwards resulting in a hazardous run away condition. Correct alignment is essential to proper operation of these motors.

Traditional optical encoders utilize ball bearings, flexible couplings, bushings, and shafts, and incorporate manual or machine optical alignment during manufacture and other expensive components or manufacturing steps to produce a reliable and accurate rotary optical encoder.

The majority of rotary encoders produced today utilize a set of ball bearings to create a stable platform on which the encoder operates. This is made necessary due to the fact that the air gap and alignment between the rotating disc in the encoder and the adjacent sensor must be accurately controlled especially in high line count encoders. In addition, the ball bearings are forced to transmit all motor shaft motion irregularities to all of the encoder components.

It is therefore an object of the present invention to substitute a new and innovative method of bringing the active elements of the encoder into alignment and holding that alignment at a minimum of cost. It is a further object of the present invention to provide parts that are injection molded from advanced plastic compounds to further reduce cost, assembly labor, and improve overall performance and reliability. Encoders are well suited for systems that measure rate-of-movement variables such as velocity and RPM. In certain applications they may be used to measure distance of linear motion (e.g. feet or inches of movement).

Encoders themselves do not do the counting or the control function. Rather, the counting is done in the external electronics. Although it would be possible to introduce the external control functions within the encoder; this possibility is considered within the scope of this patent. The point at which the counting begins is controlled by electronics located externally and/or internally on the circuit board. The circuit board is not material to the interpretation of this patent.

There are various methods used by encoders to reference shaft position. Transmissive optical type encoders utilize an LED(s), a transparent disc, and sensor(s). Perforated optical type encoders utilize an LED(s), a solid disc with perforations, and sensor(s). Magnetic type encoders utilize magnetic components and a sensor(s). Reflective type encoders utilize a reflective surface, LED(s), and sensor(s). Within these types of encoders, there are categories that divide the various styles further. There are also absolute rotary encoders (single turn and multiple turn) that give position without the need to count to track shaft location, but rather give a direct reading of location from various codes recorded on the disc. Upon power up, an incremental encoder must go to a "home" position to begin a controlled move whereas an absolute encoder will know it's location upon powering up the encoder's electronics. There may be other encoding techniques yet to be developed and this patent will apply equally to those as well. Most of the details of this document will be described by the reflective style encoder, but can be interpreted to include the other styles described.

The present invention describes the design of a component that modifies the design of the previous mentioned encoder styles. It is a component that can be integrated into the various previously mentioned encoder styles or new encoder styles in numerous ways.

DETAIL DESCRIPTIONS OF THE INVENTION

Figure 1:
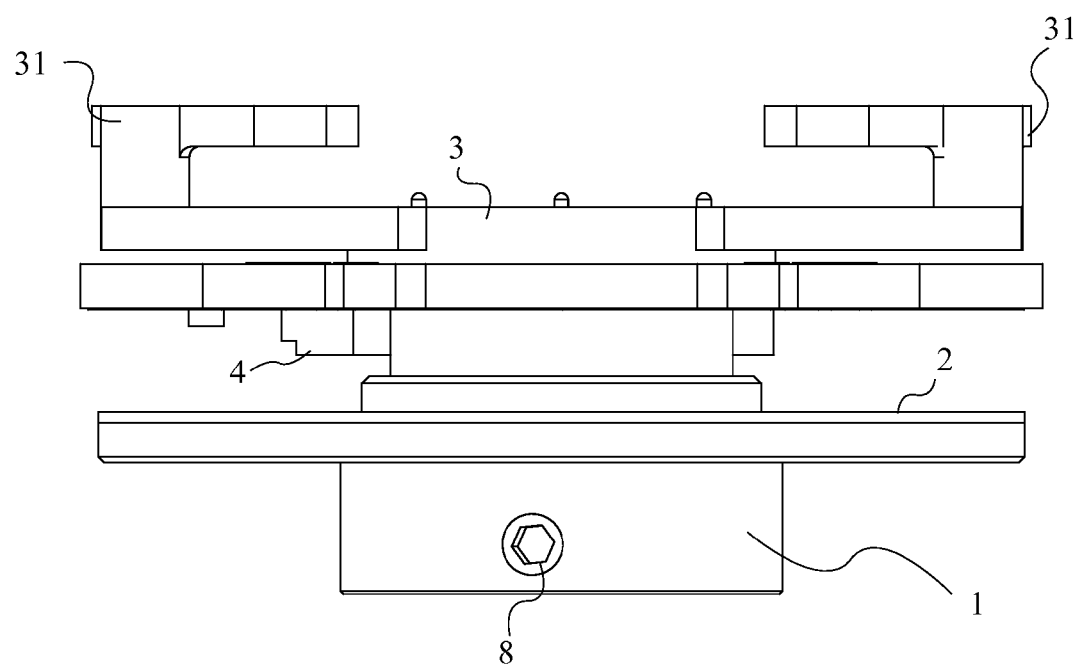
FIG. 1 is a front view of the present invention.
Figure 2:
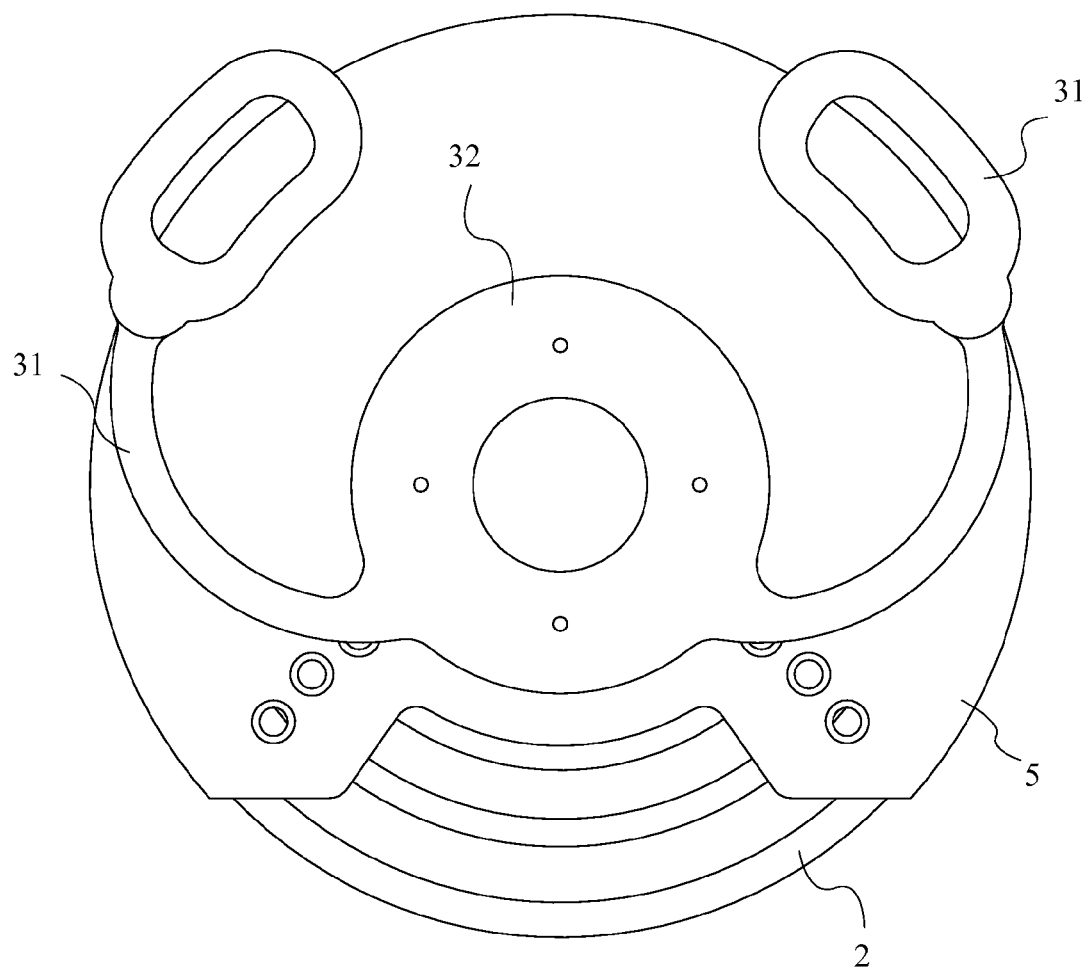
FIG. 2 is a top view of the present invention.
Figure 3:
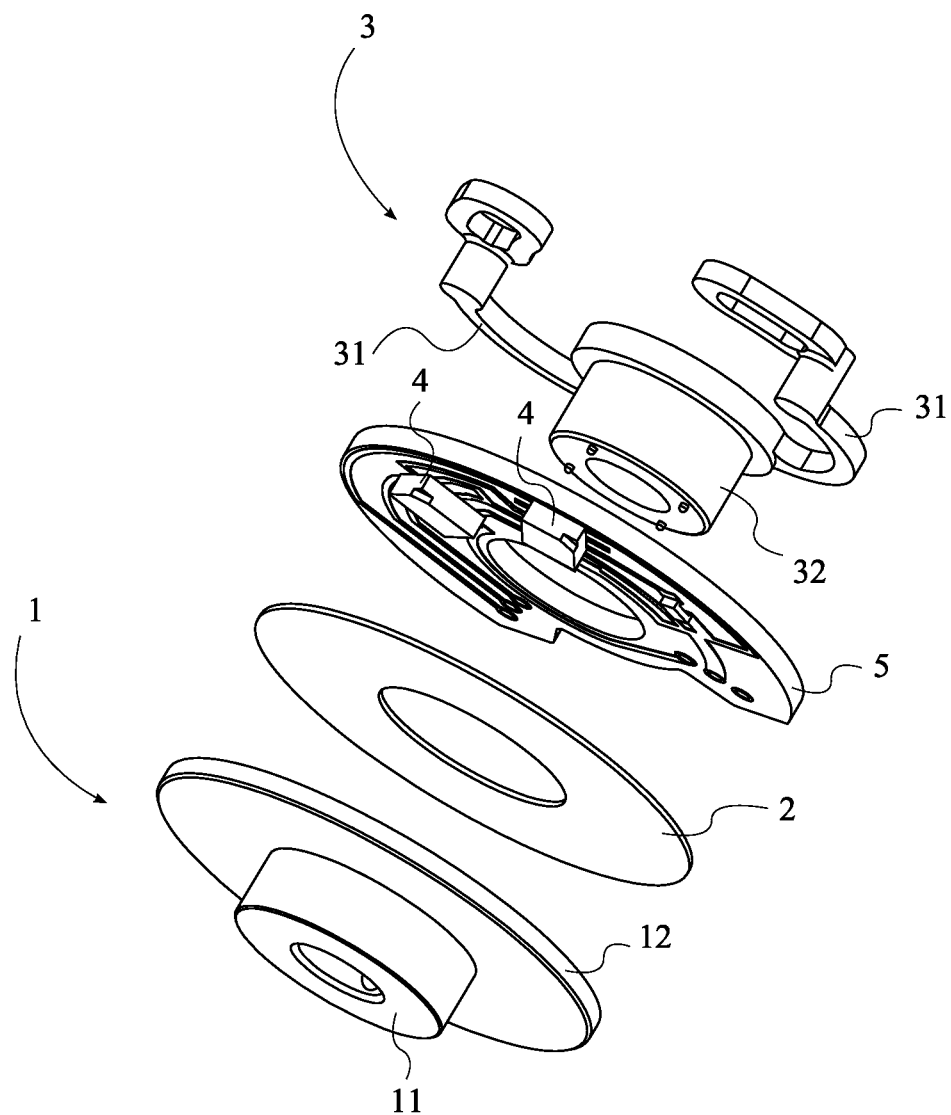
FIG. 3 is an exploded perspective view of the present invention.
Figure 4:
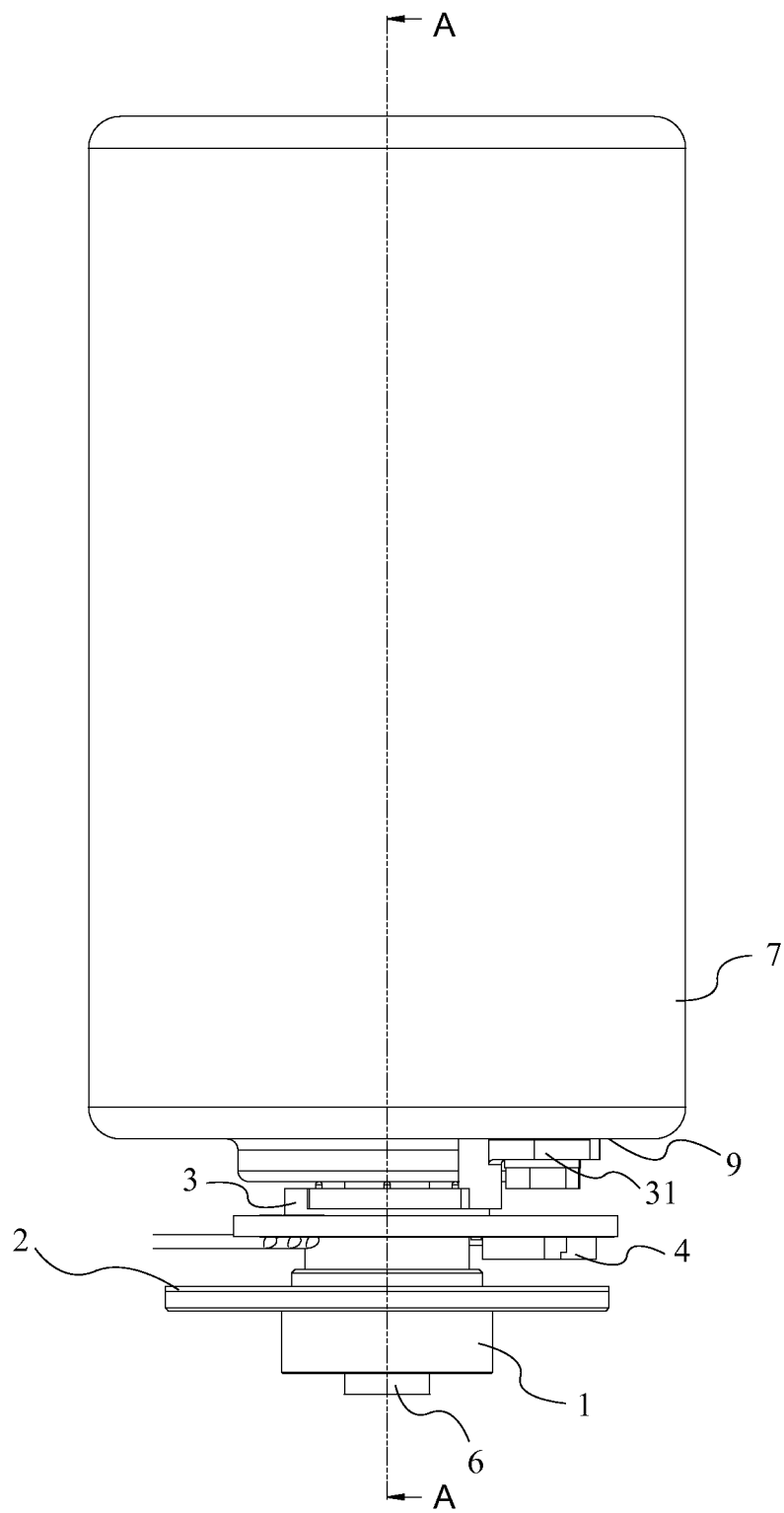
FIG. 4 is a side view of the present invention being used with a shaft driven by a motor.
Figure 5:
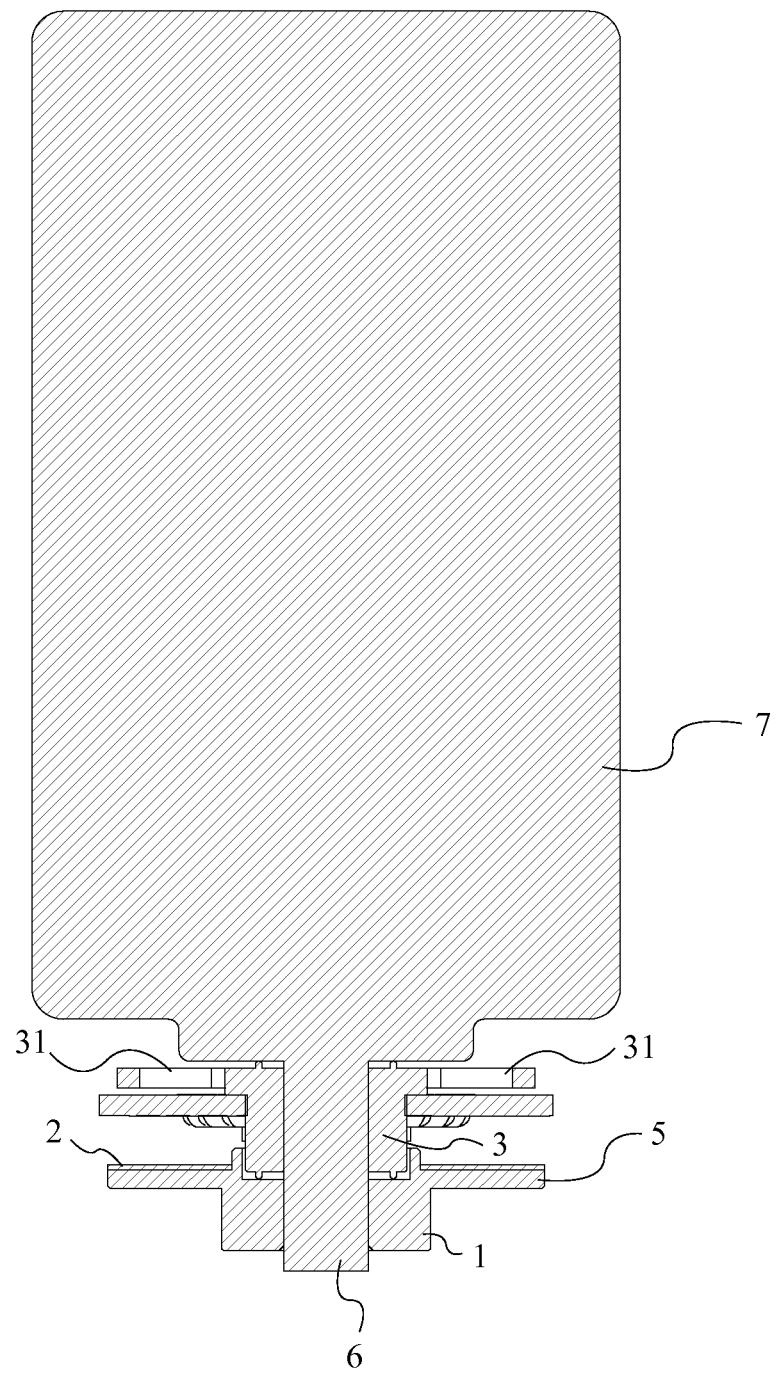
FIG. 5 is a sectional view of FIG. 4 taken along line A-A.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a rotary encoder with a free-floating sensor carrier, eliminating the need for bearing mounts and/or flexible mounts typically utilized in rotary encoders. The sensor carrier is the focus of the present invention and is the aspect of the present invention that distinguishes the present invention from current designs. The "floating" aspect of the sensor carrier refers to the ability of the sensor carrier to be positioned at a specified location along the axis of a shaft by use of stabilizing arms connected to a mounting surface—the sensor carrier "floats" in its place along the shaft. In addition to eliminating the traditional need for bearings, the present invention allows a significant reduction in encoder material and component costs, such as expensive bearings, as well encoder assembly cost and overall size of the encoder. The sensor carrier of the present invention is capable of supporting numerous components such as one or multiple sensors, as well as the encoder's associated printed circuit board. It should be noted that while in general a singular sensor is referred to hereinafter, the present invention is not limited to a single sensor and may comprise multiple sensors in alternate embodiments as desired or as appropriate for the particular style of encoder. Additionally, the sensor carrier is made of a lightweight material compared to current encoder designs which improves acceleration and reduces both startup and running torque, which are characteristics of benefit to small motors. A further benefit of the present invention is that a housing for the encoder is not required. The design of the present invention allows economical mounting of just a component mounted sensor carrier and matching disc on the back of motors with a simple motor manufacturers cover (if required). This application requires no additional time consuming and technical alignment or other actions as seen in the use of Modular or "kit" encoders. Furthermore, the design of the present invention allows stacking of multiple sensor carrier and disc assemblies on a single motor shaft.

The free floating sensor carrier design presented herein represents a significant technological improvement over all preceding mechanical designs. A significant reduction in both material and assembly labor costs are achieved while maintaining a high level of device stability, reliability and performance under many different operating conditions.

With some design modifications it is further anticipated that some very difficult environments including very high shock and vibration and others involving very high rates of acceleration may see performance improvements due to the very low mass of the sensor carrier and its consequent reduction in the forces created during acceleration and deceleration while simultaneously maintaining the encoder's optical alignment. It should be noted that the point at which the carrier's flexible arms meet the main body of the carrier may be either on the center of the axis of rotation or off this line; both are considered as covered by this patent.

It should further be noted that a carrier based encoder as described in this patent, when either attached to the shaft or tailshaft of an electric motor, is unaffected by the gradual wear of the motor's bearings in an adverse manner such as is experienced by the traditional bearing style encoder.

Referring to FIGS. 1-5, the preferred embodiment of the present invention generally comprises a bushing 1, an encoder disc 2, a sensor carrier 3, and a sensor 4. The bushing 1, the encoder disc 2, and the sensor carrier 3 concentrically encircle a shaft 6, wherein the shaft 6 is assumed to be rotationally driven by a motor 7. The motor 7 as referenced herein is a broad term and is not intended to be limiting the present invention. The use of a motor 7 to rotate the shaft 6 is assumed, however the inclusion of a motor 7 is not explicitly necessary for the present invention, as the present invention only applies to measuring the rotation of a shaft 6, and any other means may be utilized to rotate the shaft 6. That being said, the shaft 6 being driven by a motor 7 is a very likely arrangement which is assumed to be the case for the purposes of the present invention.

The bushing 1 is rotationally affixed to the shaft 6 by a screw 8 or screws, wherein the bushing 1 spins at the same angular speed as the shaft 6. The bushing 1 serves to hold the encoder disc 2 in place around the shaft 6. While bushings used in encoders are traditionally made of metal, the bushing 1 of the present invention can be made of anti-wear plastic. The low inertia requirements of the present invention make this possible. The bushing 1 comprises a shaft attachment portion 11 and a flange 12, which are positioned concentrically with each other and are connected axially adjacent to each other.

The encoder disc 2 is positioned concentrically with and axially adjacent to the bushing 1 and is connected to the bushing 1, wherein the encoder disc 2 and the bushing 1 spin at the same angular speed. More particularly, the encoder disc 2 is connected to the flange 12 of the bushing 1 opposite the shaft attachment portion 11. The encoder disc 2 may be made of various different materials and have various features depending on the type of encoder the present invention is applied to. If the present invention is applied to an optical transmissive type encoder, the encoder disc 2 is made of an opaque or otherwise light transmissive material. If the present invention is applied to a perforated optical type encoder, the encoder disc 2 comprises a plurality of perforations.

If the present invention is applied to a reflective encoder, the encoder disc 2 is made of or coated with a light reflective material. If the present invention is applied to a magnetic type encoder, the encoder disc 2 comprises a plurality of magnetic inserts. With each of the aforementioned encoder type variations, it should be understood that the sensor 4 is of an appropriate sensor type applicable to the respective encoder type. For example, with a magnetic encoder the sensor 4 detects changes in magnetic field as the encoder disc 2 spins. It should be understood that in various embodiments relating to the various different encoder types the encoder disc 2 will be comprised as is commonly known as appropriate for the specific encoder type embodied.

In the preferred embodiment of the present invention, the sensor carrier 3 is made of a special plastic material which incorporates anti-wear components or additives within a formula that stipulates a ratio of surface area to component weight. The material of the sensor carrier 3 should ideally have a high lubricity or be from a category of materials with limited wear properties. More particularly, in the preferred embodiment the sensor carrier 3 is made from a thermoplastic material with anti-wear properties and a large area to weight ratio. Additionally or alternatively, the result is a sensor carrier 3 that is long-lasting and capable of replacing the bearings of even high-end encoders. However, in alternate embodiments the sensor carrier 3 could be made of virtually any material and even incorporate a bearing if it could provide some special benefit such as in high temperature applications. If used in this manner, the sensor carrier 3 could possibly use steel flex arms to provide the necessary "floating" concept.

As previously mentioned, the sensor carrier 3 eliminates the need for bearings and/or flexible mounts for accurately positioning the sensor 4. The sensor carrier 3 may vary widely in structure, but in all embodiments the sensor carrier 3 comprises a plurality of stabilizing arms 31 and a shaft alignment portion 32 which is cylindrical and concentrically encircles the shaft 6. Each of the plurality of stabilizing arms 31 are connected to the shaft alignment portion 32 either directly or by being connected to a body of the sensor carrier 3 which is in turn connected to the shaft alignment portion 32, and in some embodiments the plurality of stabilizing arms 31 may be connected to each other to provide further structural support.

The shaft 6 is radially aligned with the shaft alignment portion 32 in order to maintain a consistent annular gap between the shaft 6 and the carrier, wherein the consistent annular gap is very small in order to maintain the sensor 4 in a specified radial and angular alignment relative to the shaft 6. In other words, an inner diameter for the shaft alignment portion 32 and an outer diameter for the shaft 6 should be matched to the best possible degree that allows the shaft 6 to rotate with minimal interference. This may require tight tolerances during manufacture. This fit allows the carrier to follow any and all radial and axial movements of the shaft 6, thus maintaining the necessary alignment with the disc. Alternatively stated, the shaft alignment portion 32 and the shaft 6 should be dimensioned such that a central axis for the shaft alignment portion 32 and a central axis for the shaft 6 are coincident or as close as possible to coincident at all times. The sensor carrier 3 of the present invention, by virtue of using the same shaft 6 as the disc for alignment, eliminates the need for alignment and gapping tools used in kit encoders.

The sensor carrier 3 carries any or all appropriate sensors 4 mounted to it. There can be multiple sensors 4 of various types of sensors 4 mounted to the sensor carrier 3. The sensor 4 or sensors 4 are aligned to one of the disc types mounted on the bushing 1. The sensor 4 or sensors 4 can be connected by flexible wires to printed circuit boards that are located in another position. Additionally, the sensor carrier 3 can have slots to help reduce contact area to facilitate hub cooling in high speed operation. The sensor carrier 3 hub also allows designs using inserts of different lubricating materials, or needle type bearings.

The sensor carrier 3 is connected to a mounting surface 9 by the plurality of stabilizing arms 31, wherein the sensor carrier 3 is held rotational stationary relative to the shaft 6 by the plurality of stabilizing arms 31. The plurality of stabilizing arms 31 allows the body of the sensor carrier 3 to simulate the movement of the shaft 6 while preventing the body of the sensor carrier 3 from rotating relative to the shaft 6. Any tilting motion the shaft 6 undergoes will be transferred to the shaft alignment portion 32 of the sensor carrier 3 so that the sensor carrier 3 will match the tilting motion of the shaft 6. The plurality of stabilizing arms 31 themselves can be located and attached in a variety of ways to any structure provided that is mounted in a rigid mode. The arms can be attached to the base 101, cover 102, or any rigid mounting surface 9. The mounting surface 9 may be a motor 7 housing 100 for the motor 7, the mounting surface 9 may be an interior surface 91 of a housing 100 containing the bushing 1, encoder disc 2, circuit board 5 and sensor carrier 3, or the mounting surface 9 may be any surface that is stationary relative to the shaft 6.

As previously mentioned, several types of encoders exist. The type of encoder is immaterial to the present invention as the focus of the present invention is on the use of the sensor carrier 3 for maintaining the position of the sensor 4 or sensors 4. In one particular embodiment, the present invention is applied to an optical encoder. This embodiment comprises a light source such as but not limited to a light emitting diode (LED), and in this embodiment the sensor 4 is a light sensor 4. The light source and the light sensor 4 are positioned opposite each other across the encoder disc 2 in the case of the present invention being applied to a transmissive optical encoder. In another embodiment where the present invention is applied to a reflective type optical encoder, the light source and the light sensor 4 are positioned on the same side of the encoder disc 2 as commonly arranged in reflective type optical encoders.

In one embodiment of the present invention a circuit board 5 is connected between the sensor 4 and the sensor carrier 3. In this embodiment, the circuit board 5 is positioned axially adjacent to the sensor carrier 3 and is positioned between the encoder disc 2 and the sensor carrier 3. The circuit board 5 and the encoder disc 2 are separated by a specified gap which is known arrangement for rotary encoders. In this embodiment the sensor 4 is connected to the circuit board 5 opposite the sensor carrier 3, wherein the sensor 4 is held in a specific angular and radial alignment relative to the shaft 6 by the sensor carrier 3 through the circuit board 5.

Figure 6:
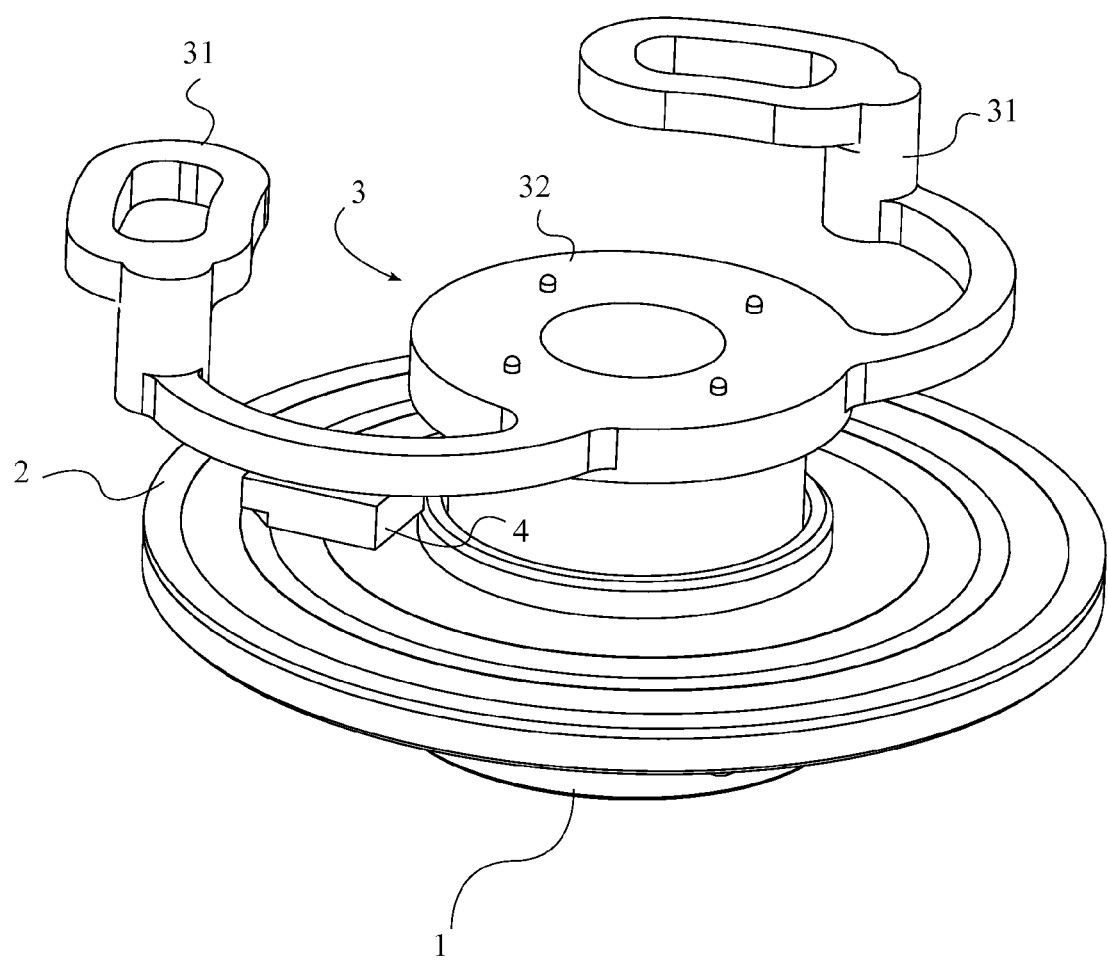
FIG. 6 is a perspective view of an embodiment of the present invention where the sensor is connected directly to the sensor carrier.

In another embodiment, the circuit board 5 is located external to the encoder assembly itself and is connected to the sensor 4 by wires. In this embodiment the sensor 4 is connected directly to the sensor carrier 3 as seen in FIG. 6, wherein the sensor 4 is held in a specific angular and radial alignment relative to the shaft 6 by the sensor carrier 3, and the sensor 4 is positioned between the sensor carrier 3 and the encoder disc 2. Furthermore, the sensor 4 is separated from the encoder disc 2 by a specified gap.

Figure 7:
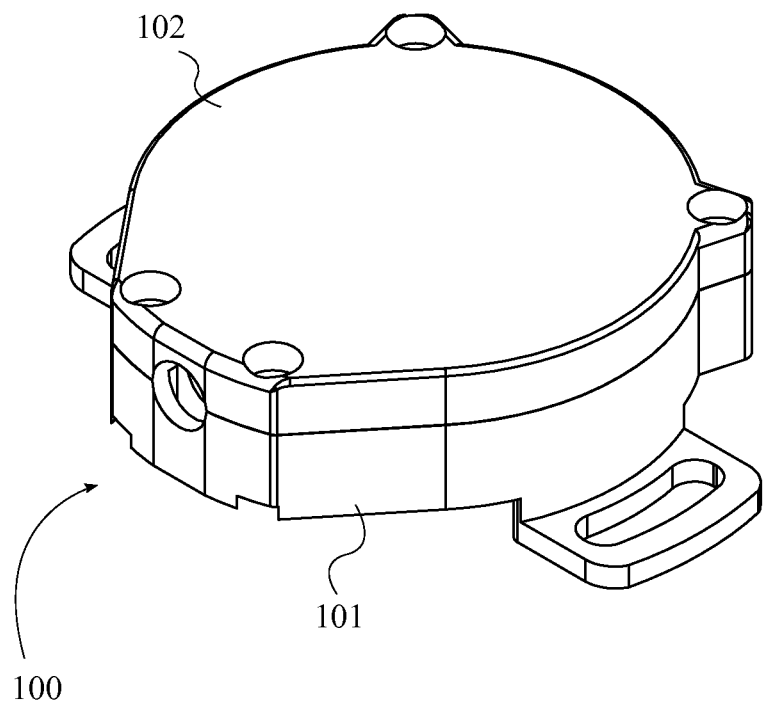
FIG. 7 is a perspective view of an embodiment of the present invention incorporating a housing.
Figure 8:
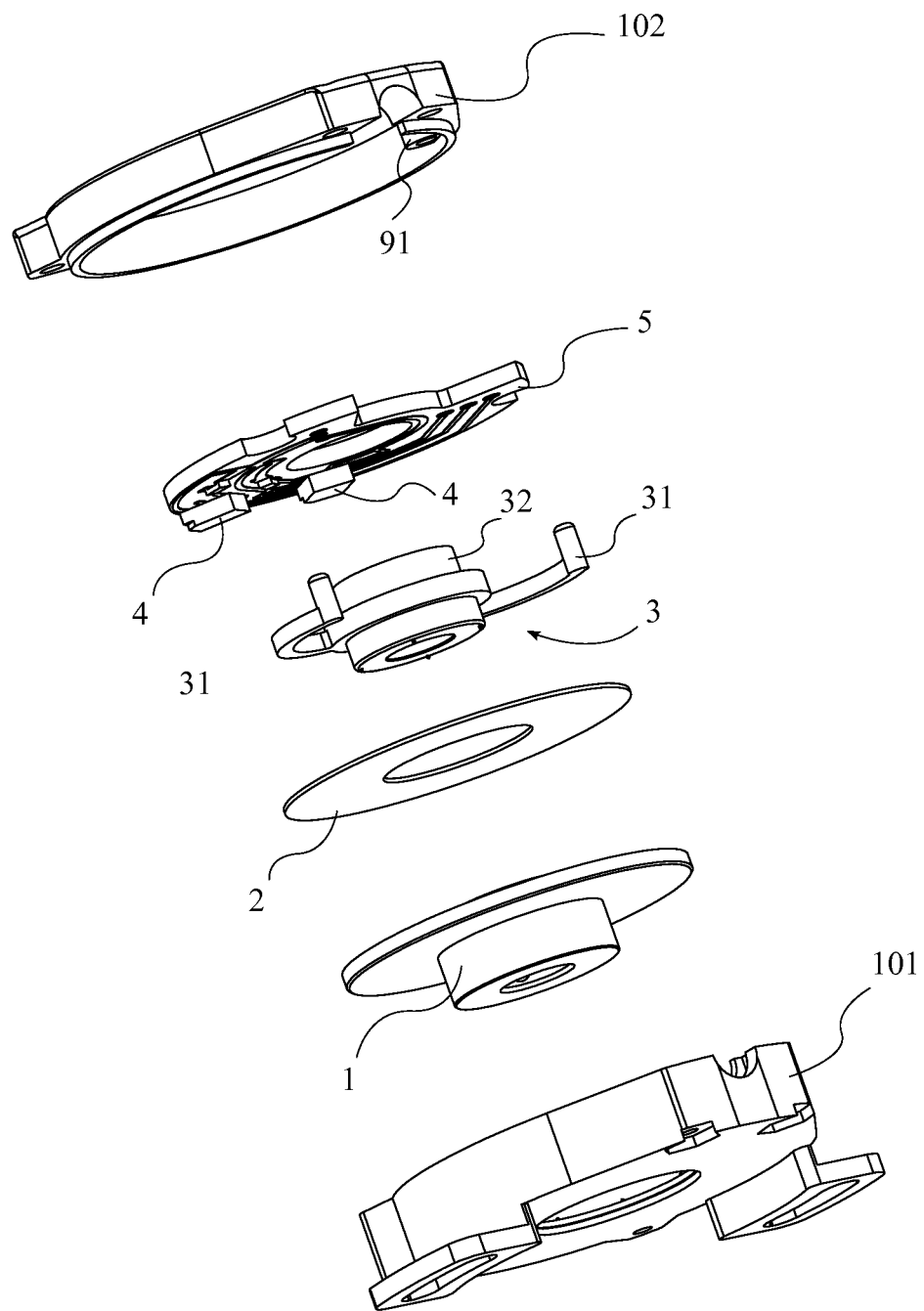
FIG. 8 is an exploded view of an embodiment of the present invention incorporating a housing.

Referring to FIG. 7-8, one embodiment of the present invention comprises a housing 100, though it should be noted that a housing 100 is not necessary for the present encoder design. In this embodiment, the bushing 1, the encoder disc 2, the sensor 4, and the sensor carrier 3 are positioned within the housing 100, as well as the circuit board 5 in embodiments where the circuit board 5 is connected to the sensor carrier 3 and is not located externally. Each of the plurality of stabilizing arms 31 is connected to an interior surface 91 of the housing 100, wherein the interior surface 91 is the mounting surface 9 in this case. Additionally, the shaft 6 traverses through the housing 100. The housing 100 comprises a cover 102 and a base 101, which are essentially two halves of the housing 100 connected to each other and seal the aforementioned components within the housing 100. The bushing 1 is positioned adjacent to the base 101 and the sensor carrier 3 is positioned adjacent to the cover 102.

Although the invention has been explained in relation to its preferred embodiment, it is to be understood that many other possible modifications and variations can be made without departing from the spirit and scope of the invention as hereinafter claimed.

What is claimed is:
1. A rotary encoder with free floating flexible sensor carrier comprises:
   a bushing;
   an encoder disc;
   a sensor carrier;
   a sensor;
   the sensor carrier comprises a plurality of stabilizing arms;
   the bushing, the encoder disc, and the sensor carrier concentrically encircling a shaft, wherein the shaft is rotationally driven by a motor;
   the bushing being rotationally affixed to the shaft, wherein the bushing spins at the same angular speed as the shaft;

the encoder disc being positioned concentrically and axially adjacent to the bushing;

the encoder disc being connected to the bushing, wherein the encoder disc and the bushing spin at the same angular speed; and the sensor carrier being connected to a mounting surface by the plurality of stabilizing arms, wherein the sensor carrier is held rotationally stationary relative to the shaft by the plurality of stabilizing arms.

2. The rotary encoder with free floating flexible sensor carrier as claimed in claim 1 comprises:

a circuit board;

the circuit board being connected to the sensor carrier;

the circuit board being positioned axially adjacent to the sensor carrier;

the circuit board being positioned between the encoder disc and the sensor carrier;

the circuit board and the encoder disc being separated by a specified gap; and the sensor being connected to the circuit board opposite the sensor carrier, wherein the sensor is held in a specific angular and radial alignment relative to the shaft by the sensor carrier through the circuit board.

3. The rotary encoder with free floating flexible sensor carrier as claimed in claim 1 comprises:

the sensor being connected to the sensor carrier, wherein the sensor is held in a specific angular and radial alignment relative to the shaft by the sensor carrier; and the sensor being positioned between the sensor carrier and the encoder disc.

4. The rotary encoder with free floating flexible sensor carrier as claimed in claim 1 comprises:

the bushing comprises a shaft attachment portion and a flange;

the shaft attachment portion and the flange being positioned concentrically with each other;

the shaft attachment portion and the flange being connected axially adjacent to each other; and the encoder disc being connected to the flange opposite the shaft attachment portion.

5. The rotary encoder with free floating flexible sensor carrier as claimed in claim 1 comprises:

the sensor carrier further comprises a shaft alignment portion;

the plurality of stabilizing arms being connected to the shaft alignment portion;

the shaft alignment portion concentrically encircling the shaft; and the shaft being radially aligned with the shaft alignment portion in order to maintain a consistent annular gap between the shaft and the carrier, wherein the consistent annular gap is very small in order to maintain the sensor in a specified radial and angular alignment relative to the shaft.

6. The rotary encoder with free floating flexible sensor carrier as claimed in claim 1 comprises:

a housing;

the bushing, the encoder disc, the sensor, and the sensor carrier being positioned within the housing; and each of the plurality of stabilizing arms being connected to an interior surface of the housing, wherein the interior surface is the mounting surface.

7. The rotary encoder with free floating flexible sensor carrier as claimed in claim 6 comprises:

the shaft traversing through the housing.

8. The rotary encoder with free floating flexible sensor carrier as claimed in claim 6 comprises:

a circuit board being positioned within the housing, wherein the sensor is connected to the circuit board;

wherein the circuit board is connected to the sensor carrier;

wherein the circuit board is positioned between the sensor carrier and the encoder disc; and wherein the sensor is positioned between the circuit board and the encoder disc.

9. The rotary encoder with free floating flexible sensor carrier as claimed in claim 6 comprises:

the housing comprises a cover and a base;

the cover and the base being connected to each other;

the bushing being positioned adjacent to the base; and the sensor carrier being positioned adjacent to the cover.

10. The rotary encoder with free floating flexible sensor carrier as claimed in claim 1 comprises:

a light source;

the sensor being a light sensor; and the light source and the light sensor being positioned opposite each other across the encoder disc.

11. The rotary encoder with free floating flexible sensor carrier as claimed in claim 1, wherein the encoder disc is made of a light transmissive material.

12. The rotary encoder with free floating flexible sensor carrier as claimed in claim 1, wherein the encoder disc is made of a light reflective material.

13. The rotary encoder with free floating flexible sensor carrier as claimed in claim 1, wherein the encoder disc comprises a plurality of perforations.

14. The rotary encoder with free floating flexible sensor carrier as claimed in claim 1, wherein the encoder disc comprises a plurality of magnetic inserts.

15. The rotary encoder with free floating flexible sensor carrier as claimed in claim 1 comprises:

the sensor carrier being made of thermoplastic material.

16. The rotary encoder with free floating flexible sensor carrier as claimed in claim 1 comprises:

the sensor carrier being made of material with anti-wear properties.

17. The rotary encoder with free floating flexible sensor carrier as claimed in claim 1 comprises:

the sensor carrier being made of material with a large area to weight ratio.

18. The rotary encoder with free floating flexible sensor carrier as claimed in claim 1, wherein the mounting surface is a motor housing for the motor.

19. The rotary encoder with free floating flexible sensor carrier as claimed in claim 1, wherein the mounting surface is an interior surface of a housing containing the bushing, encoder disc, a circuit board, and sensor carrier.

20. The rotary encoder with free floating flexible sensor carrier as claimed in claim 1, wherein the mounting surface is any surface that is stationary relative to the shaft.

* * * * *